H. C. ZIPRICK.
APPARATUS FOR CLEANING SAUSAGE SKINS.
APPLICATION FILED FEB. 17, 1915.

1,155,393.

Patented Oct. 5, 1915.
2 SHEETS—SHEET 1.

Witnesses
Edna Broyles
Ethel Stiles

Inventor
Herman C. Ziprick

By Herbert E. Smith
Attorney

COLUMBIA PLANOGRAPH CO., WASHINGTON, D. C.

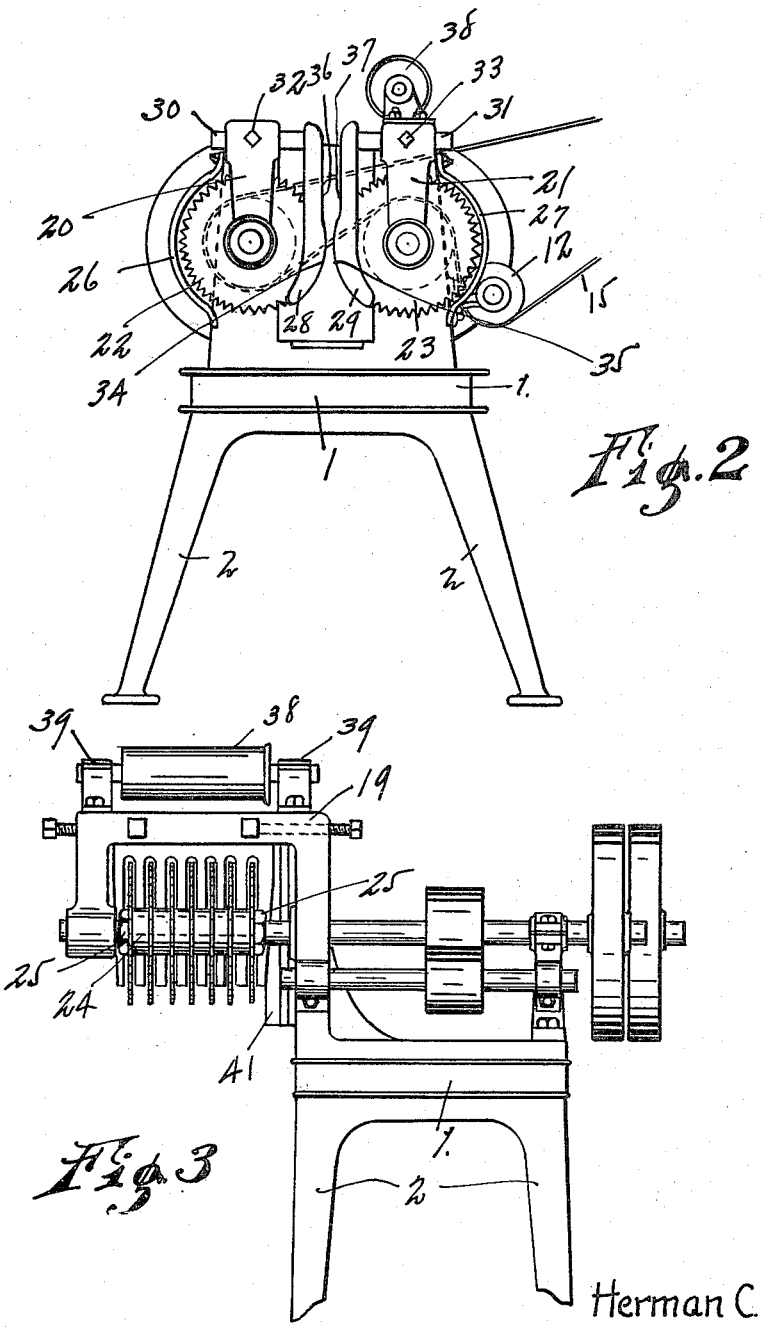

UNITED STATES PATENT OFFICE.

HERMAN C. ZIPRICK, OF SPOKANE, WASHINGTON.

APPARATUS FOR CLEANING SAUSAGE-SKINS.

1,155,393. Specification of Letters Patent. Patented Oct. 5, 1915.

Application filed February 17, 1915. Serial No. 8,897.

*To all whom it may concern:*

Be it known that I, HERMAN C. ZIPRICK, a citizen of the United States, residing at Spokane, in the county of Spokane and State of Washington, have invented certain new and useful Improvements in Apparatus for Cleaning Sausage-Skins, of which the following is a specification.

The particular object of this invention is to remove soft fatty matter which adheres to the surface of sausage casings and which has heretofore been removed by first soaking the casing in hot water and then scraping off the fat matter with knives in such a way as not to impair the integrity of the casing itself.

The device of this invention consists in applying pressure to express or press out this fatty matter in such a manner as to permit the same to be removed by devices operating in close proximity to the casing but in such spaced relation thereto as not to in any way or under any condition actually engage the casing.

The device of my invention does not in any way relate to the several methods by which the casing may be treated to loosen the fatty matter or soften the same prior to treatment of the casing in the machine, but my invention does relate not only to the machine but to the method of removing such fatty matter from the casing after it has been previously treated to soften such matter.

Other objects and features of the invention will be more fully described in connection with the accompanying drawings and will be more particularly pointed out in and by the appended claims.

Figure 1:
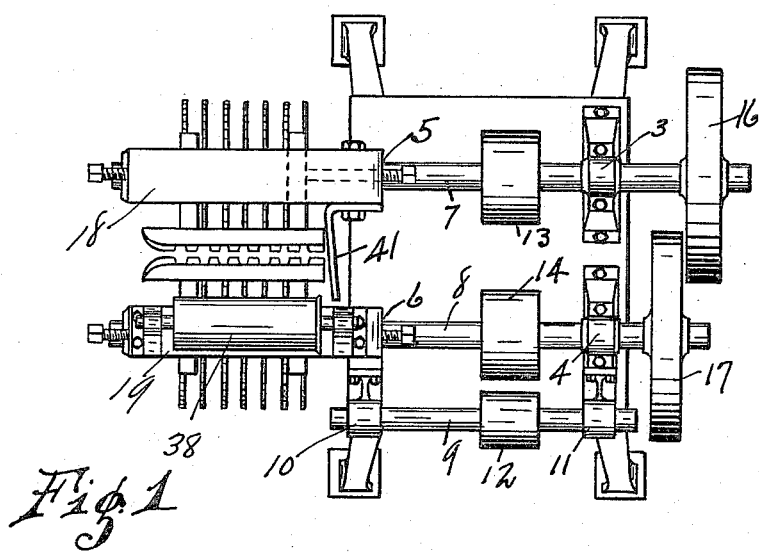
Figure 4:
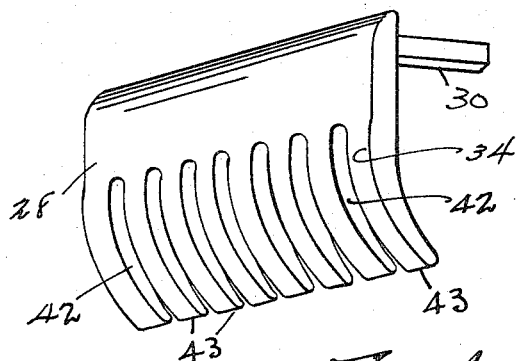

In the drawings: Figure 1 is a plan view of a machine embodying one form of my invention, Fig. 2 is a view in elevation looking from the left of Fig. 1. Fig. 3 is a view in elevation looking from the right of Fig. 2. Fig. 4 is a detail detached perspective view of one of the pressure combs for toothed members employed in the device of my invention.

Like characters of reference designate similar parts throughout the different figures of the drawings.

As illustrated, the machine of my invention is mounted upon a base 1 having supporting legs 2. Bearings 3 and 4 are mounted upon the base 1, at one side thereof, and bearings 5 and 6 are mounted on said base at the opposite side thereof, in which bearings are respectively journaled shafts 7 and 8.

An idler shaft 9 is journaled in bearings 10 and 11 and carries an idler pulley 12.

Pulleys 13 and 14 are mounted upon shafts 7 and 8, respectively, and a belt 15 is trained over said pulleys as clearly shown in Fig. 2.

Fly wheels 16 and 17 are mounted upon the right hand ends of said shafts 7 and 8 as clearly shown in Fig. 1.

Now the bearings 5 and 6 are of the inverted U-shaped type having horizontal portions 18 and 19 and depending bearing portions 20 and 21. The shafts 7 and 8 extend through and are journaled in the depending bearings 20 and 21, for a purpose which will presently appear.

Shafts 7 and 8 each carry a set of fat removers and each set comprises a series of disks 22 and 23, respectively, which are shown as having toothed or serrated peripheries. Each set of disks is first threaded or sleeved on to its respective shaft and there is interposed between each disk a spacing collar 24 for maintaining the disks in spaced relation. Clamping nuts 25 not only firmly hold the disks in fixed locked frictional relation but also serves to hold the disks locked against independent rotation with respect to their respective shafts. If desired, guards 26 and 27 may be provided to prevent injury to the operator should he get too close to the disks while the same are in operation.

Between the two sets of disks is mounted coacting fat expressors which are shown in the form of toothed or comb like members 28 and 29. Each fat expressor or comb is provided with a pair of arms 30 and 31, respectively, the arms of comb 28 being slidable through the horizontal portion 18 of bearing 5 and the arms 31 being slidable in horizontal portion 19 of the bearing 6. Locking screws 32 and 33 serve to lock the combs in adjusted position in the desired proximity with respect to each other. As will be seen more particularly by reference to Fig. 2, the combs are curved at 34 and 35, or in other words they converge toward each other, and at 36 and 37 said combs diverge so as to provide an open way upwardly through which the casing may be drawn from below the combs upwardly between the latter and over a roller 38 suitably mounted in bearings 39 on the horizontal portion 19 of bearing 6.

A guard 41 may be provided to hold the casing against movement to the right of Fig. 1 to a too great extent.

Now the spaces or interstices 42, between the comb teeth 43, are so arranged that they will register with the disks of their respective sets. In other words, the disks will project into these spaces between the comb teeth throughout a portion of the depth thereof but not sufficiently to enter between the space intervening the combs themselves and through which intervening space the casing is drawn. Now, when the casing, ladened with loose or soft fatty matter is drawn between the converging portions of the combs, it will be considerably compressed and will be flattened out in the form of a ribbon, for instance. This compression to which the casing is subjected will cause the fatty matter to exude or project between the teeth of the comb and into the spaces 42 in such a manner that the rapidly revolving disks will engage the loosened or expressed fatty matter and remove it from between the combs. The speed with which the disks are rotated will be such that the fatty matter engaged thereby will be centrifically thrown off and may if desired be caught by any suitable receptacle.

Now the process of my invention consists in manually or otherwise drawing a sausage casing or like intestinal strip between compressors, to express out the extraneous and fatty matter and loosen the same, such matter being engaged and thrown off, after being loosened, without injuring the casing.

It is believed that the device of my invention will be fully understood from the foregoing description and while I have herein shown and described one specific form of my invention, I do not wish to be limited thereto except for such limitations as the claims may import.

I claim:

1. A machine for cleaning sausage casings and the like comprising in combination, coacting pressure combs between which the casing is adapted to be manually or otherwise advanced to express and loosen extraneous matter thereon, and operating removers projecting into the comb spaces for engaging and removing such expressed matter, substantially as described.

2. A machine for cleaning sausage casings and the like comprising in combination, coacting pressure members between which the casing is adapted to be manually or otherwise advanced to express and loosen extraneous matter thereon, said pressure members having openings for projection thereinto of such expressed matter, and means projecting into such openings for removing such expressed matter therefrom, substantially as described.

3. A machine for cleaning sausage casings and the like comprising in combination, coacting pressure members between which the casing is adapted to be manually or otherwise advanced to express and loosen extraneous matter therefrom, means for adjusting such members toward and from each other in accordance with the pressure to be exerted upon the casing, said members having openings for discharge of such express matter thereinto, and rotary means projecting into said openings for engaging and throwing off such expressed matter, substantially as described.

4. A machine for cleaning sausage casings and the like comprising in combination, a pair of comb pressure members shaped to converge from their ends toward their central portions and the teeth of which extend in the path of the casing drawn therebetween to a point slightly beyond the point of greatest convergence, means for adjusting said combs toward and from each other to vary the pressure to be exerted on the casing, and rotating removers projecting into the comb spaces at the point of greatest convergence but not into the space between said combs, substantially as described.

5. A machine for cleaning sausage casings and the like comprising in combination, a pair of pressure comb members shaped to converge from their ends toward their central portions and the teeth of which extend in the path of the casing to be drawn therebetween to a point slightly beyond the point of greatest convergence, means for adjusting said combs toward or from each other to vary the pressure to be exerted on the interposed casing, and rotating disks one projecting into each comb space and provided with peripheral teeth for removing the matter expressed into such comb spaces, substantially as described.

6. A machine for cleaning sausage casings and the like comprising in combination, sets of rotating disks arranged in opposed relation with the adjacent peripheries of said sets spaced apart from each other, and pressure combs disposed between said sets with the teeth of said combs overlapping the disks of said sets, the adjacent pressure faces of said combs being arched corresponding to the curvature of the peripheries of said disks, substantially as described.

HERMAN C. ZIPRICK.

Witnesses:
H. E. SMITH,
EDNA BROYLES.